(12) United States Patent
Polkinghorn et al.

(10) Patent No.: US 7,770,576 B2
(45) Date of Patent: Aug. 10, 2010

(54) HINGE MECHANISM FOR BARBEQUE GRILLS AND SMOKERS

(75) Inventors: Timothy A. Polkinghorn, Mineral Point, WI (US); Duane A. Carley, Dodgeville, WI (US)

(73) Assignee: Forté Products LLC, Argyle, WI (US)

( * ) Notice: Subject to any disclaimer, the term of this patent is extended or adjusted under 35 U.S.C. 154(b) by 869 days.

(21) Appl. No.: 11/528,851

(22) Filed: Sep. 28, 2006

(65) Prior Publication Data

US 2008/0078374 A1    Apr. 3, 2008

(51) Int. Cl.
    *F24B 3/00*    (2006.01)
(52) U.S. Cl. .................... 126/194; 126/25 R; 126/41 R
(58) Field of Classification Search .................. 126/194, 126/25 R, 41 R; 16/286, 287, 288, 289
    See application file for complete search history.

(56) References Cited

U.S. PATENT DOCUMENTS

| 1,059,221 | A | 4/1913 | Saylor |
| 1,923,063 | A | 8/1933 | Bergstrom et al. |
| 3,520,290 | A | 7/1970 | Winters |
| 3,714,937 | A | 2/1973 | Linstead |
| 4,062,340 | A | 12/1977 | Huff |
| 4,382,312 | A | 5/1983 | Liggett et al. |
| 4,853,985 | A | 8/1989 | Perry |
| 5,355,558 | A | 10/1994 | Vertanen |
| 5,394,590 | A | 3/1995 | Yu |
| 6,253,760 | B1 | 7/2001 | Mashburn et al. |
| 6,463,923 | B2 | 10/2002 | Carley et al. |
| 6,499,189 | B2 * | 12/2002 | Kondo et al. .................. 16/289 |

\* cited by examiner

*Primary Examiner*—Alfred Basichas
(74) *Attorney, Agent, or Firm*—Michael Best & Friedrich LLP

(57) ABSTRACT

A hinge mechanism for the lids of barbeque grills and smokers, especially for use with ceramic grills and smokers that have very heavy lids. A barbeque grill/smoker includes a base tub and a lid. The invention pivotally couples the base tub to the lid using a four pivot axis linkage. The pivotal coupling allows reciprocal movement from a lid closed position to a lid open position. The hinge mechanism may include a spring assist feature.

16 Claims, 4 Drawing Sheets

HINGE MECHANISM FOR BARBEQUE GRILLS AND SMOKERS

FIELD OF THE INVENTION

This invention pertains generally to barbeque grills, smokers, and the like and especially to grills and smokers having heavy lids, such as ceramic grills and smokers, and, more particularly, to hinges and other mechanisms for connecting the lids of grills or smokers to a lower tub portion thereof.

BACKGROUND OF THE INVENTION

Barbeque grills and smokers typically include a lower tub portion that is open at the top and a typically domed lid that mates with the open top of the lower tub. The tub portion typically is designed to contain coals, wood, or another heat source as well as to support a grill or other cooking surface or structure above the heat source. The lid is designed to mate with the lower tub to enclose the interior of the barbeque grill or smoker during cooking to improve cooking performance, provide for indirect cooking, etc. The lid and/or the tub of the barbeque grill or smoker may have adjustable vents formed therein, thereby to provide the operator with more control of the cooking temperature and process.

The lid on all grills and smokers must be able to be readily repositioned or removed to allow the operator access to the cooking surface within. In many cases the lid is not attached to the tub in any way, such that the lid is removed from the tub by simply lifting it up and away. Once removed, however, the operator must either hold the lid while accessing the cooking surface or find a place to set down a, in many cases, hot grill lid. Both options are inconvenient, unsanitary, and potentially dangerous. Thus, in some cases, grill or smoker lids will be attached to the lower tub using a hinge structure that allows the lid to be opened to access the grilling surface, without requiring that the lid be removed entirely. For example, a conventional favored method is to hinge the lid to the tub from the rear (12 o'clock position) allowing it to be opened from the front (6 o'clock position) by an attached handle.

Many grills and smokers are made of a relatively light weight metal material. However, ceramic grills and smokers are rapidly growing in popularity due to the many advantages obtained from the thick and heavy, high temperature ceramic materials they are made from. A grill or smoker made from ceramic material poses several unique design challenges relating to removal and replacement of the unusually heavy lid. That is, conventional methods of removing a lid from a grill or smoker tub or attaching a lid to the tub are even more inconvenient and ineffective when applied in the context of a ceramic grill or smoker having a very heavy lid.

Various present designs for attaching the lid of a grill or smoker to the lower tub portion thereof using a hinge structure differ mainly in the method employed of holding the lid in a desired open position. Common hinge designs utilize a single rear pivot axis located at the back of the grill or smoker (12 o'clock position) with support struts that are located on the sides of the grill or smoker (approximately in the 3 o'clock and 9 o'clock positions) and that extend between the lid and the lower tub portion. The support struts are locked in place by the operator's one remaining free hand as his other hand holds the lid in the open position. This design is awkward and somewhat dangerous as the operator has to place his hands or a suitable tool near the heat source to engage and disengage the struts each time the lid is opened or closed. The operator also has to lift the bulk of the lid's weight as it is pivoted open on the rear located hinge, which is particularly problematic for heavy ceramic grill lids.

Another rear hinge design utilized a torsion spring powered latching mechanism that automatically engaged when the lid was raised to the full open position. This design required one hand to open and two hands to close the lid, since the operator had to depress a release lever to disengage the latching mechanism while closing the lid with the opposite hand. Although such a design is safer and more user friendly than the earlier hinge design without an automatic latching mechanism, it also has its limitations. If an operator tried forcibly to close the lid without first depressing the release lever, the lid supporting bands that are used to attach the hinge mechanism to the ceramic lid would bend and the lid would fall out and break. An uninformed new operator or curious passerby could cause this to occur. This is an expensive and potentially dangerous occurrence. Furthermore, such a design does nothing to solve the problem of the operator having to lift the bulk of the lid's weight as it pivots on the rear located hinge.

U.S. Pat. No. 6,463,923 describes a rear single pivot axis design hinge mechanism for connecting a grill lid to the grill tub which utilizes an adjustable compression spring that forces a shaped latch tab against a roller. As the grill lid is opened, the shaped latch tab ramps onto the roller while it is compressing the spring until it reaches a shaped depression at the end of the latch tab that engages with the roller. This engagement action stops further opening of the grill lid and holds the lid at the desired opening angle. To close the lid, the operator pulls down on the lid forcing the depression in the latch tab to disengage the roller.

The amount of force required to close the lid is adjustable by changing the spring pressure with an adjusting bolt. Although this overall design is an improvement over previous designs, it also has several limitations. As with the previous designs, the operator has to lift the bulk of the lid's weight as it pivots on the rear located hinge, a particular problem with heavy ceramic grill lids. This hinging mechanism also requires proper maintenance and adjustment by the operator. If the roller isn't lubricated periodically, it will require excess force to engage and disengage the latching mechanism. This eventually results in the lid working its way out of the supporting bands that attach the lid to the hinge mechanism, causing the lid to fall to the ground (usually breaking), this is both dangerous and expensive. Improper adjustment of the spring tension can cause the lid to close on its own without warning, possibly causing personal injury. Improper adjustment of the spring pressure can also cause the lid to work its way out of the support bands and fall to the ground.

Other hinge mechanism designs exist that use a rear-pivoting hinge in conjunction with compression or extension springs that assist in lifting the weight of the lid from the tub while opening or closing it. Such assisted lift hinge mechanism designs pose several limitations as well. The springs used in these designs are at maximum strength when the lid is in the closed position. This typically doesn't allow the full weight of the lid to be applied to the gasket that seals air from leaking between the lower tub and the lid. Air leakage makes the grill temperature very difficult or impossible to control. Air leakage also allows the hot gasses from inside the grill to escape; this usually results in the gasket rapidly burning out, and that further compounds the leakage problem. The possibility of complete spring failure always exists, and springs gradually lose their strength over time in any case. Either of these scenarios could cause the lid to close on its own without warning, possible causing personal injury.

Therefore, what is needed is a new hinge mechanism for connecting the lid to the lower tub portion of a barbeque grill or smoker that will meet the following criteria: The hinge mechanism should safely maintain the lid in the open position without the use of springs, or any manual or automatically locking/unlocking latches or support struts. The hinge mechanism should allow all or nearly all of the lid's weight to bear on the gasket surfaces between the lid and the tub when in the closed position. The hinge mechanism should not require more effort from the operator to open or close the lid than current assisted lift hinge designs. The hinge mechanism should provide for limited adjustability for lid placement in relation to the base tub as compensation for ceramic manufacturing variances between the lid and the base tub concentricity and diameters.

SUMMARY OF THE INVENTION

The present invention provides a hinge mechanism for the lids of barbeque grills and smokers, especially for use with ceramic grills and smokers that have very heavy lids. Such a barbeque grill/smoker includes a base tub and a lid. The invention pivotally couples the base tub to the lid. The pivotal coupling allows reciprocal movement from a lid closed position to a lid open position.

The hinge mechanism of the present invention is a four-pivot axis, linkage design comprised of parallel left and right upper rear pivot axis brackets, parallel left and right lower rear pivot axis brackets, both pivotally connected by a flat rear linkage bar, and parallel left and right upper front pivot axis brackets, parallel left and right lower front pivot axis brackets, both pivotally connected by an offset front linkage bar. As the operator grasps the lid handle and begins to lift the lid, both the front and rear linkage bars begin to lift the rear portion of the lid upward and rearward as they rotate on their respective arcs of travel. As the rear linkage bar rotates counter clockwise from the lid closed position and travels past the 12 o'clock position it begins to guide the rear of the lid rearward and downward. Simultaneously, the front linkage bar is rotating counter clockwise from the lid-closed position on its upward arc of travel, guiding the front of the lid upward and rearward. As the front linkage bar passes the 12 o'clock position gravity begins to assist in opening the lid (the lid will actually balance with the front linkage bar being at the 12 o'clock position). At this point the operator is merely guiding the lid handle upward and rearward as the lid's weight is causing both linkage bars to continue to rotate counterclockwise. As the lower linkage bar passes approximately the 10 o'clock position it begins to guide the rear of the lid forward and downward. Simultaneously the front linkage bar guides the front of the lid rearward and downward. This opposing action rapidly increases the opening angle of the lid in relation to the base tub. Both the front and rear linkage bars continue downward on their arcs of travel until each lower linkage bar contacts a stop protrusion located on the lower edge of each of the upper rear pivot axis tabs. The lid is now held open safely by its own weight bearing on the over center linkage bars. Closing the lid involves the operator grasping the lid handle and applying moderate downward force, thus reversing the process.

The pivot axis brackets may be attached by way of threaded fasteners to the commonly used clamping bands that encircle the periphery of the grill base tub and lid. This is by no means the only method of pivot axis attachment, i.e. direct attachment to the grill/smoker base tub and lid by means of threaded fasteners is also possible. In the case of a metal grill/smoker any commonly known metal fastening method could be used.

A hinge mechanism in accordance with the present invention may also include an optional spring assist. The spring assist is designed for use with the heaviest grill lids to further reduce the amount of weight operators of a smaller stature would have to lift while opening the grill lid. The spring assist also smoothes the opening and closing cycles of the heaviest grill lids by reducing the unexpected weight transfer to the operator when the hinge mechanism travels past its balance point.

The spring assist includes, in addition to the hinge mechanism components already described, a front spring bracket, spring, rear spring bracket, and various attaching hardware. The spring assist is installed on both sides of a grill for balanced pull. The spring assist may use an extension type coil spring as an energy source, or any of the other commonly known spring types (e.g., torsion, compression, leaf, gas or hydraulic springs to name a few) could be applied to produce similar results.

The geometry of the spring assist is designed so that the spring is nearly parallel to the front linkage bar when the grill lid is in the closed position. This parallel relationship gives the hinge mechanism a definite mechanical advantage over the spring's energy. This is necessary to reduce the lifting effect in the closed position so as not to compromise the seal between the grill lid and base.

As the grill lid is opened by the operator, the front linkage bar begins to rotate upward and rearward and in doing so the spring's pull angle changes to give the spring a mechanical advantage and it begins to assist in pulling the lid upward and rearward. As the front linkage bar approaches the twelve o'clock position, the assist spring is almost completely relaxed and the operator is simply moving the lid rearward as the hinge mechanism is carrying the majority of the lid's weight. As the front linkage bar passes twelve o'clock gravity begins to take over and the assist spring is completely relaxed and simply hangs in the front and rear brackets. The spring assist feature has no effect on holding the lid in the open position, this is still done solely by the lid's weight and the over center hinge linkage.

A hinge mechanism in accordance with the present invention provides several advantages over common known hinge mechanisms. A hinge mechanism in accordance with the present invention holds the grill lid safely in the open position without the use of any springs, manual or automatically locking/unlocking latches or support struts. It effectively uses the lid's own weight as an energy source in conjunction with the over center effect of the linkage bars to maintain the lid in the open position. A hinge mechanism in accordance with the present invention allows all or nearly all of the lid's weight to be applied to the gasket surfaces in the closed position, thereby not compromising the seal between the lid and the base tub. A hinge mechanism in accordance with the present invention requires no more or less (with the spring assist) lifting force to open the lid as the current most popular spring assisted hinge design. (This has been confirmed with a digital scale on the largest grill offered by the most popular ceramic grill manufacturer). A hinge mechanism in accordance with the present invention also may be designed to provide adequate adjustability for lid placement in relation to the base tub (as compensation for ceramic manufacturing variances between the lid and the base tub concentricity and diameters). This is achieved by providing horizontal mounting slots in both of the upper rear pivot axis brackets, and in both of the upper front pivot axis brackets.

Further objects, features, and advantages of the present invention will be apparent from the following detailed description as take along with the accompanying drawings.

DETAILED DESCRIPTION OF THE INVENTION

Figure 1:
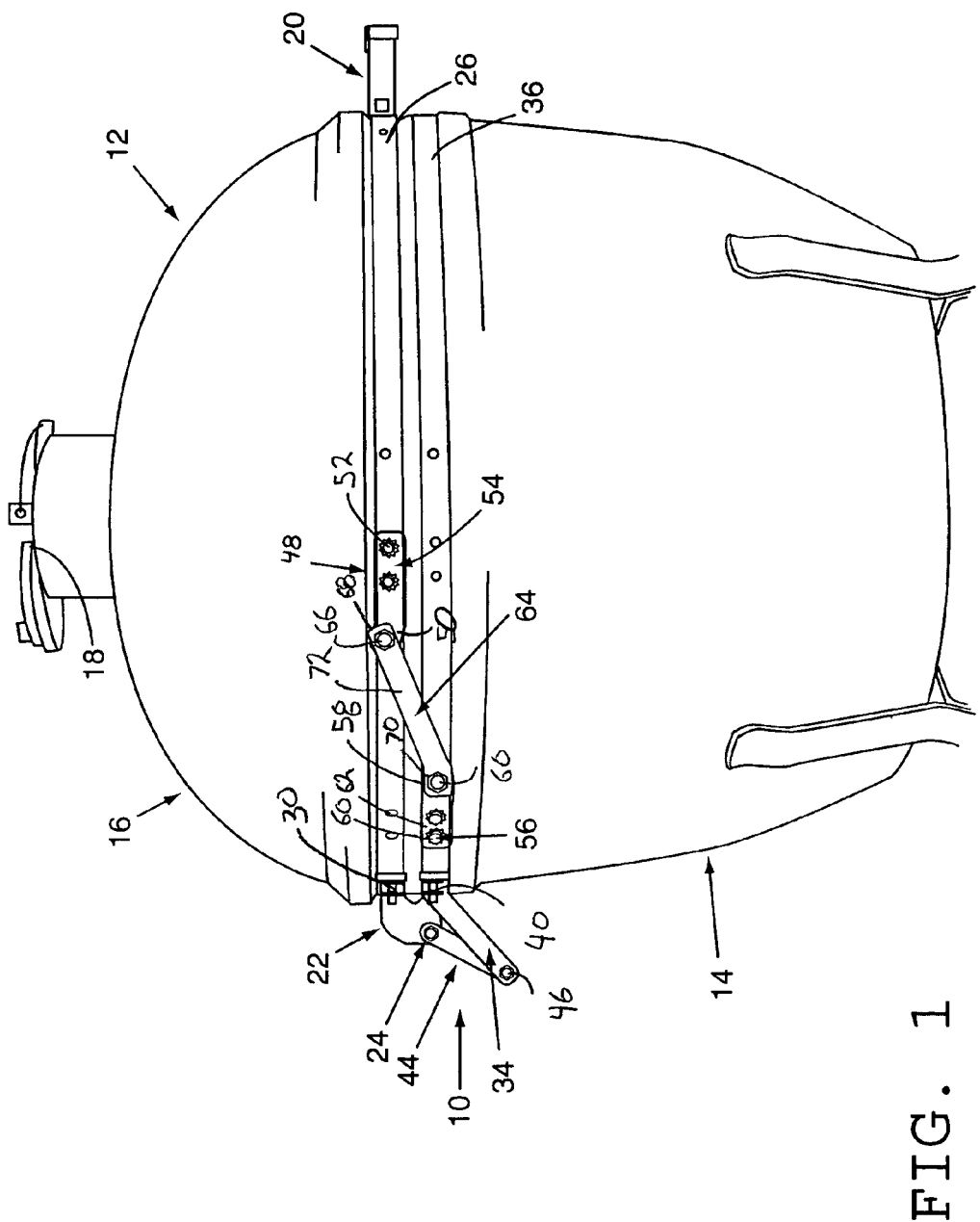
FIG. 1 is a side view illustration of a ceramic grill including an exemplary hinge mechanism in accordance with the present invention connecting a lid to a tub portion of the grill with the lid shown in a closed position.
Figure 2:
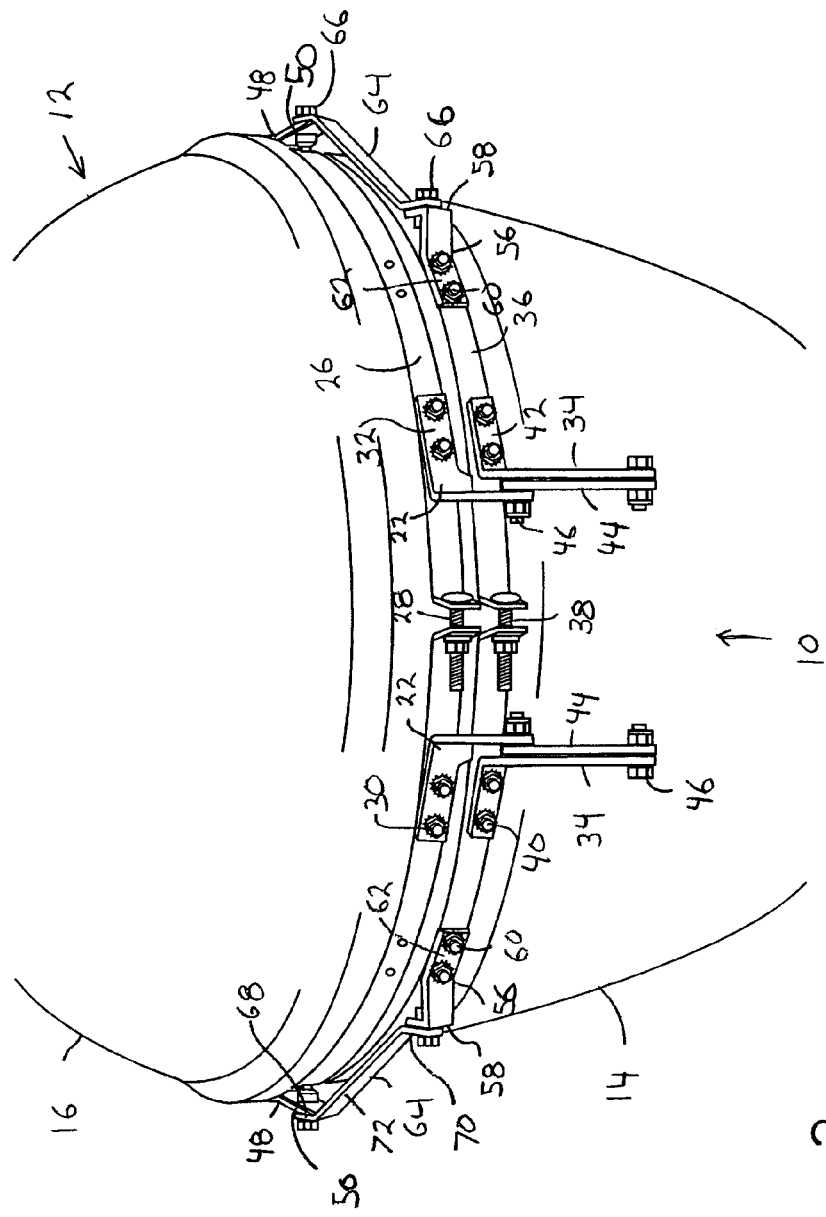
FIG. 2 is an upper rear perspective view illustration of the exemplary grill and hinge mechanism of FIG. 1.

The structure and operation of a first preferred embodiment of a hinge mechanism 10 in accordance with the present invention will now be described in detail with reference to use thereof with a ceramic grill 12 as shown in FIGS. 1 and 2. It should be understood, however, that the present invention is not limited to such an application and may be used in combination with any barbeque grill or smoker or similar device made of any common material, including metal grills and smokers of any shape or size. It should be understood that the generic term "grill" as used herein, including in the attached claims, and unless otherwise specified, refers to barbeque grills and smokers and similar devices of any shape or size and made of any appropriate material.

As illustrated, the ceramic grill 12 includes a base tub portion 14 and a lid 16. In this case, both the tub portion 14 and the lid 16 are made of a relatively thick ceramic material, and thus the lid 16 is quite heavy. The base tub portion 14 of the grill 12 is open along a top edge thereof and is adapted to contain the heat source for the grill 12, which may include coals, wood, a gas burner, or any other heat source. The base tub portion 14 is also adapted to support, on the inside thereof, one or more grills or other cooking surfaces or structures. The lid 16 is dome shaped and shaped and sized at the open bottom edge thereof to engage the top edge of the tub portion 14 to enclose the interior of the grill 12 when the lid 16 is closed. A gasket of appropriate material, not shown, may be provided on either the upper edge of the tub portion 14 or the lower edge of the lid 16, or both, to provide a seal between the tub 14 and the lid 16 when the lid is closed. One or more adjustable vents 18 may be provided on the lid 16 and/or the tub portion 14 to allow an operator to control cooking temperature when the lid 16 is closed.

A hinge mechanism 10 in accordance with the present invention couples the base tub 14 to the lid 16 of the grill 12 via a pivotal coupling that allows reciprocal movement from a lid closed position to a lid open position. For the description that follows, the "front" of the grill 12 (and therefore of the base tub 14 and lid 16) will refer to the side of the grill 12 having a handle 20 attached to the lid 16 (the 6 o'clock position when viewed from above and in front of the grill). The "rear" of the grill 12 (and therefore of the base tub 14 and lid 16) will refer to the opposite side of the grill 12 from the front (the 12 o'clock position when viewed from above and in front of the grill). The "sides" of the grill 12 extend along the periphery of the upper edge of the base tub 14 and lower edge of the lid 16 between the front and rear of the grill 12. As will be discussed in more detail below, a hinge mechanism 10 in accordance with the present invention is mounted to the grill 12 at the rear and sides thereof.

The hinge mechanism 10 of the present invention provides a four pivot axis linkage. Parallel left and right upper rear pivot axis brackets 22 are mounted to the lower edge of the lid 16 on the outside thereof at the rear of the grill 12. As shown in FIG. 1, the parallel left and right upper rear pivot axis brackets 22 each extend initially directly rearward from the lid 16 and terminate in a slightly downward extending portion 24. This downward extending portion 24 of the upper rear pivot axis brackets 22 thus extends downward below the upper edge of the base tub 14.

The parallel left and right upper rear pivot axis brackets 22 may be attached to the lower edge of the lid 16 via a metal clamping band 26 that is mounted to the lid 16 on the outside thereof around the lower edge thereof. The clamping band 26 is secured to the lid 16 via a nut and bolt 28 or other structure that is used to pull the band 26 tight around the lid 16. The parallel left and right upper rear pivot axis brackets 22 are then attached using nuts and bolts 30 or other fasteners that extend through a flange portion 32 thereof into the metal clamping band 26. This allows the left and right upper rear pivot axis brackets 22 to be attached to the lid without forming holes through the ceramic lid 16. It should be understood, however, that the left and right upper rear pivot axis brackets 22 may be attached to the lid in any appropriate manner. For a grill having a metal lid, for example, it may be appropriate to attach the rear pivot axis brackets 22 to the lid directly using appropriate fasteners.

Corresponding parallel left and right lower rear pivot axis brackets 34 are mounted to the upper edge of the base tub 14 below the parallel left and right upper rear pivot axis brackets 22. As illustrated in FIG. 1, the parallel left and right lower rear pivot axis brackets 34 extend downward and rearward from the upper edge of the base tub 14. The parallel left and right lower rear pivot axis brackets 34 may be attached to the tub 14 in the same manner as the parallel left and right upper rear pivot axis brackets 22 are attached to the lid 16. For example, the parallel left and right lower rear pivot axis brackets 34 may be attached to the tub 14 via a metal clamping band 36 that is attached around the periphery of the upper edge of the tub 14 on the outside thereof. A nut and bolt 38 are provided to pull the metal clamping band 36 tight around the tub 14. The parallel left and right lower rear pivot axis brackets 34 are then attached to the metal clamping band 36 using nuts and bolts 40 or other fasteners that extend through a flange portion 42 of the parallel left and right lower rear pivot axis brackets 34 into the metal clamping band 36. As discussed above, however, with reference to the left and right parallel upper rear pivot axis brackets 22, the left and right lower rear pivot axis brackets 34 may be attached to the metal band 36 or directly to the tub 14 in any other appropriate manner.

The left and right upper rear pivot axis brackets 22 are separated from each other along the rear side of the lid 16 such that the distance from each such bracket to the exact rear point of the lid 16 is equal. Similarly, the left and right lower rear pivot axis brackets 34 are separated from each other along the rear side of the tub 14 by a similar distance, such that the distance from each such bracket to the exact rear point of the tub 14 is equal. The separation distance between each of the left and right upper rear pivot axis brackets 22 and each of the left and right lower rear pivot axis brackets 34 may be selected for convenience to provide desired stability for the lid 16 as the lid 16 is being opened and open. A distance of several inches between the each of the left and right upper rear pivot axis brackets 22 and left and right lower rear pivot axis brackets 34 may be selected, for example.

Corresponding left and right upper rear pivot axis brackets 22 and left and right lower rear pivot axis brackets 34 are pivotally connected by a rear linkage bar 44. (The corresponding left and right upper rear pivot axis brackets 22 and left and right lower rear pivot axis brackets 34 are illustrated in FIG. 2 as being positioned slightly offset from each other such that the rear linkage bar 44 is attached to one side of the upper rear pivot axis bracket 22 and to the other side of the corresponding lower rear pivot axis bracket 34. Alternatively, and preferably, the upper 22 and lower 34 rear pivot axis bracket may be aligned such that the rear linkage bar 44 is attached to the same (either) side of corresponding upper 22 and lower 34 rear pivot axis brackets.) The rear linkage bars 44 are pivotally connected at one end thereof to the downward extending portion 24 of the parallel left and right upper rear pivot axis brackets 22 and at the other end thereof to the distal end of the corresponding left or right lower rear pivot axis brackets 34. The pivotal connection between the linkage bar 44 and the parallel left and right upper rear pivot axis brackets 22 and left and right lower rear pivot axis brackets 34 may be provided using appropriate fasteners 46 that extend through corresponding holes, not shown, extending through the linkage bar, the downward extending portions 24 of the parallel left and right upper rear pivot axis brackets 22, and the distal portions of the parallel left and right lower rear pivot axis brackets 34.

Parallel left and right upper front pivot axis brackets 48 are mounted on the lid 16 of the grill 12 forward from the parallel left and right upper rear pivot axis brackets 22, e.g., on each side of the grill lid 14 near the lower edge thereof. Each parallel left and right upper front pivot axis bracket 48 includes a flat extending portion 50 oriented parallel to the left and right upper rear pivot axis brackets 22 and parallel left and right lower rear pivot axis brackets 34. The parallel left and right upper front pivot axis brackets 48 may be attached to the lid 16 via nuts and bolts 52 or any other appropriate fastener extending through a flange portion 54 of the parallel left and right upper front pivot axis brackets 48 into the metal clamping band 26 attached to the grill lid 16. Alternatively, the parallel left and right upper front pivot axis brackets 48 may be attached to the metal clamping band 26 or directly to the lid 16 in any other appropriate manner.

Parallel left and right lower front pivot axis brackets 56 are mounted near the upper edge of the base tub 14 of the grill 12 along the side of the grill 12 forward of the left and right lower rear pivot axis brackets 34 but rearward of the parallel left and right upper front pivot axis brackets 48. The parallel left and right lower front pivot axis brackets 56 also include a flat extending portion 58 that is oriented parallel to the extending portion 50 of the left and right upper front pivot axis brackets 48 as well as to the parallel left and right upper rear pivot axis brackets 22 and parallel left and right lower rear pivot axis brackets 34. The parallel left and right lower front pivot axis brackets 56 may be attached to the base tub 14 via nuts and bolts 60 or other fasteners that extend through a flange portion 62 of the parallel left and right lower front pivot axis brackets 56 into the metal clamping band 36 attached to the tub 14. Alternatively, the parallel left and right lower front pivot axis brackets 56 may be attached to the metal clamping band 36 or directly to the tub 14 in any other appropriate manner.

An offset front linkage bar 64 pivotally connects the corresponding left and right upper front pivot axis brackets 48 with the corresponding left and right lower front pivot axis brackets 56. The offset front linkage bar 64 is pivotally connected at each end thereof to the extending parallel flat portions 50 and 58, respectively, of the left and right upper front pivot axis brackets 48 and corresponding left and right lower front pivot axis brackets 56. The offset front linkage bar 64 may be pivotally connected to corresponding upper 48 and lower 56 front pivot axis brackets by use of appropriate fasteners 66 that extend through holes (not shown) in end portions 68 and 70 of the offset front linkage bar 64 into corresponding holes (not shown) in the parallel flat portions 50 and 58, respectively, of corresponding upper 48 and lower 56 front pivot axis brackets. The end portions 68 and 70 of the offset front linkage bar 64 are parallel to each other but offset from each other by a central portion 72 of the offset front linkage bar 64 that is at an angle to the end portions 68 and 70 thereof.

The upper 22 and lower 34 rear pivot axis brackets, rear linkage bar 44, upper 48 and lower 56 front pivot axis brackets, and offset front linkage bar 64, and other hardware described herein, may be made with any appropriate durable structural material using any known fabrication process. For example, stainless steel or another appropriate metal or other material may be cut, bent, welded, molded, or otherwise formed in a conventional manner to form the components of a hinge mechanism 10 in accordance with the present invention as described herein.

Figure 3:
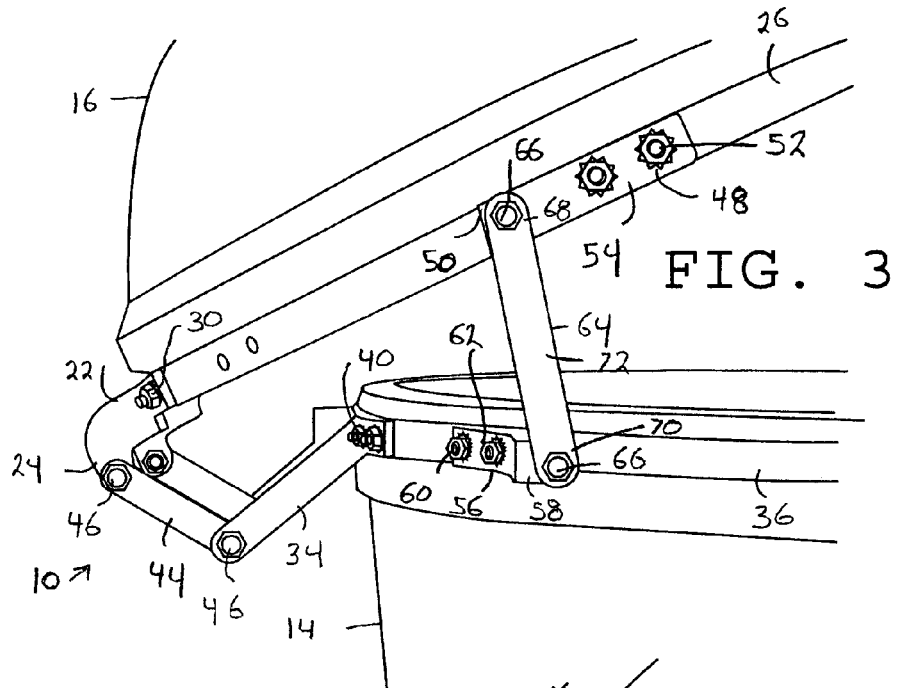
FIG. 3 is a close-up side view illustration of the exemplary grill and hinge mechanism of FIG. 1 with the grill lid shown in a partially open position.
Figure 4:
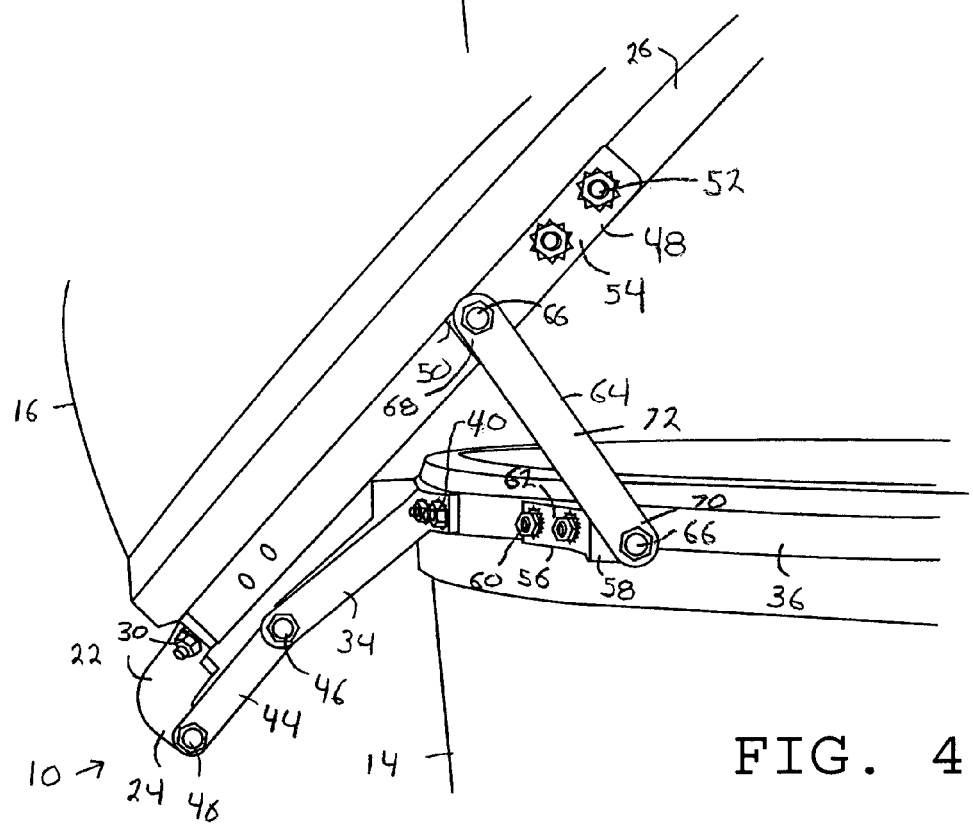
FIG. 4 is a close-up side view illustration of the exemplary grill and hinge mechanism of FIG. 2 with the grill lid shown in a fully open position.

Operation of the hinge mechanism 10 of the present invention will now be described in detail with further reference to FIGS. 3 and 4. With the grill lid 16 initially in a closed position, as illustrated in FIG. 1, an operator grasps the lid handle 20, positioned on the front of the grill lid 16, opposite the parallel left and right upper rear pivot axis brackets 22, and begins to lift the lid 14 upward. Both the front 64 and rear 44 linkage bars begin to lift the rear portion of the lid 14 upward and rearward as they rotate on their respective arcs of travel. As the rear linkage bar 44 rotates counter-clockwise from the lid closed position and it travels past the 12 o'clock position (as viewed in FIGS. 2-4.) it begins to guide the rear of the lid 14 rearward and downward. Simultaneously, the front linkage bar 64 is rotated counter-clockwise from the lid closed position on its upward arc of travel, guiding the front of the lid 16 upward and rearward. As the front linkage bar 64 passes the 12 o'clock position (as shown in FIG. 3) gravity begins to assist in opening the lid 16 (the lid 16 will actually balance with the front linkage bar 64 being at the 12 o'clock position). At this point, the operator is merely guiding the lid handle 20 upward and rearward as the lid's weight is causing both linkage bars 44 and 64 to continue to rotate counter-clockwise. As the lower linkage bar 44 passes approximately the 10 o'clock position it begins to guide the rear of the lid 16 forward and downward. Simultaneously, the front linkage bar 64 guides the front of the lid 16 rearward and downward. This opposing action rapidly increases the opening angle of the lid 16 in relation to the base tub 14. Both the front 64 and rear 44 linkage bars continue downward on their arcs of travel until each linkage bar 44 and 64 contacts a stop protrusion located on the lower edge of each of the upper rear pivot axis tabs 22 and 48. The lid 16 is now held open safely by its own weight bearing on the over center linkage bars 44 and 64, as shown in FIG. 4. Closing the lid 16 involves the operator grasping the lid handle 20 and applying moderate downward force, thus reversing the process.

An alternative embodiment hinge mechanism 100 in accordance with the present invention includes a spring assist. This alternative embodiment will now be described in detail with reference to FIGS. 5-7. The alternative embodiment incorporates the same components and structures as described above and illustrated with reference to FIGS. 1-4, and the same reference numerals will thus be used for the corresponding structures in FIGS. 5-7. The spring assist is designed for use with the heaviest grill lids to further reduce the amount of weight operators of a smaller stature would have to lift while opening the grill lid. The spring assist also smoothes the opening and closing cycles of the heaviest grill lids by reducing the unexpected weight transfer to the operator when the hinge mechanism travels past its balance point.

The spring assist feature will be described as attached on one side of a grill 12 with a hinge mechanism 100 in accordance with the present invention. However, the spring assist is installed on both sides of the grill 12 for balanced pull.

The spring assist includes an extension spring 102 connected at one end thereof to the front linkage bar 64 and at the other end thereof to the grill tub 14 near the upper edge thereof and near the parallel lower front pivot axis brackets 56. For this purpose an appropriate bracket 104 may be provided on the front linkage bar 64 and another appropriate bracket 106 attached to the tub 14 adjacent to, or as part of, the parallel left and right lower front pivot axis brackets 56. The exemplary spring assist as illustrated uses an extension type coil spring 102 as an energy source. This should not be considered the only spring type power source that could be used for this application. It should be understood that any of the other commonly known spring types (e.g., torsion, compression, leaf, gas or hydraulic springs to name a few) could be applied to produce similar results.

Figure 5:
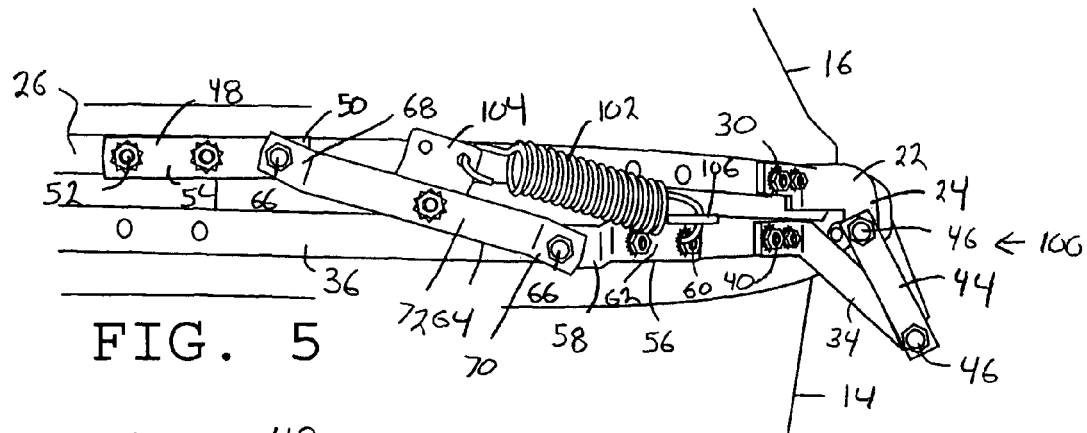
FIG. 5 is a close-up side view illustration of a ceramic grill including an exemplary alternative embodiment of a hinge mechanism in accordance with the present invention having a spring assist feature with the grill lid shown in a closed position.
Figure 6:
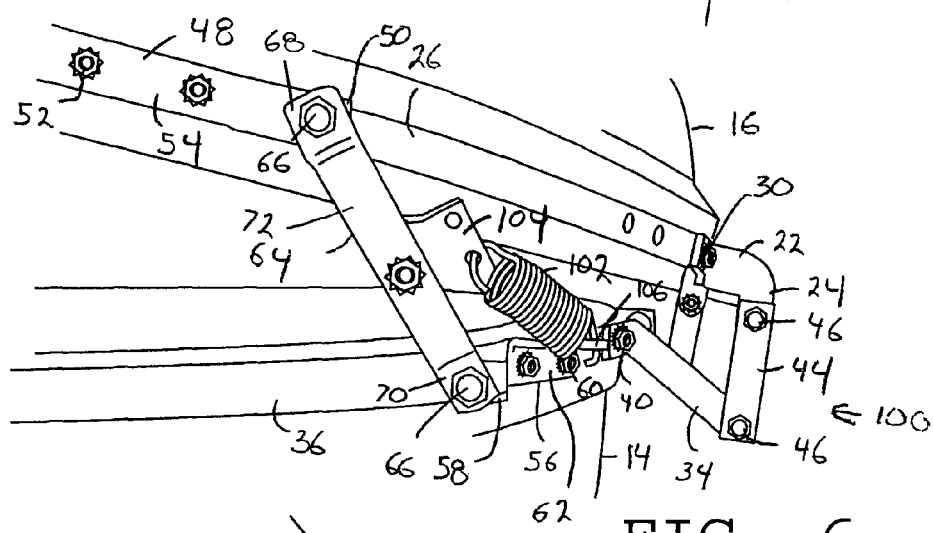
FIG. 6 is a close-up side view illustration of the grill and alternative embodiment hinge mechanism of FIG. 5 with the grill lid shown in a partially open position.
Figure 7:
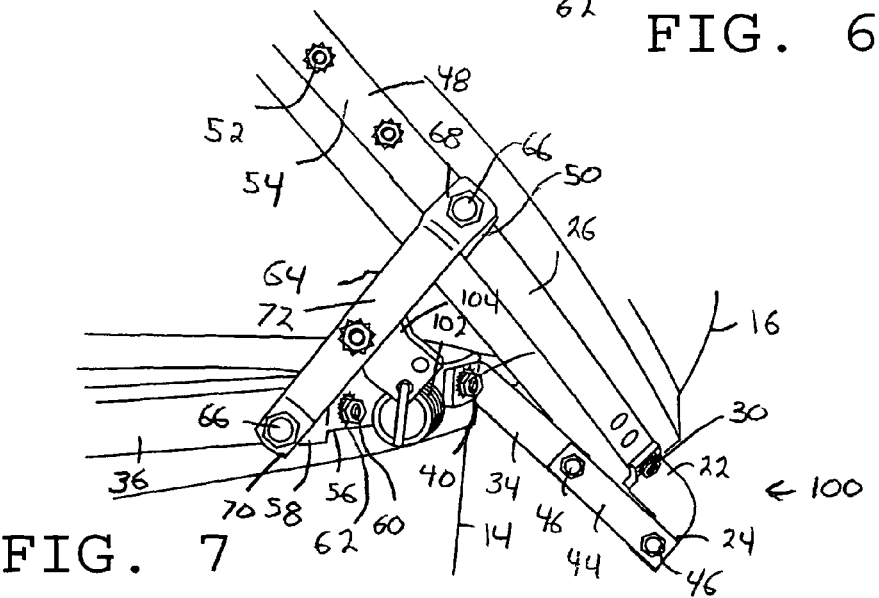
FIG. 7 is a close-up side view illustration of the grill and alternative embodiment hinge mechanism of FIG. 5 with the grill lid shown in a fully open position.

The geometry of the spring assist is designed so that the spring 102 is nearly parallel to the front linkage bar 64 when the grill lid is in the closed position, as shown in FIG. 5. This parallel relationship gives the hinge mechanism a definite mechanical advantage over the spring's energy. This is necessary to reduce the lifting effect in the closed position and not compromise the seal between the grill lid 16 and the base tub 14. As the grill lid is opened by the operator, the front linkage bar 64 begins to rotate upward and rearward and in doing so the spring's pull angle changes to give the spring a mechanical advantage and it begins to assist in pulling the lid upward and rearward. As shown in FIG. 6, as the front linkage bar 64 approaches the twelve o'clock position, the assist spring is almost completely relaxed and the operator is simply moving the lid 16 rearward as the hinge mechanism 100 is carrying the majority of the lid's weight. As the front linkage bar 64 passes the twelve o'clock position, gravity begins to take over and the assist spring 120 is completely relaxed and simply hangs in the front 104 and rear 106 brackets, as shown in FIG. 7. The spring assist has no effect on holding the lid 16 in the open position, this is still done solely by the lid's weight and the over center hinge linkage.

It should be understood that the present invention is not limited to the particular exemplary applications and embodiments illustrated and described herein, but embraces all such modified forms thereof as come within the scope of the following claims.

What is claimed is:

1. A hinge mechanism for a grill having a base tub including an open top defined by a upper edge thereof and a lid having an open bottom defined by a bottom edge thereof and adapted to be mated to the open top of the base tub, the hinge mechanism comprising:
   (a) left and right upper rear pivot axis brackets mounted at a rear of the lid at the lower edge thereof and extending rearward therefrom;
   (b) left and right lower rear pivot axis brackets mounted at a rear of the tub at the upper edge thereof and extending rearward therefrom;
   (c) a rear linkage pivotally connected between each of the left upper and lower rear pivot axis brackets and right upper and lower rear pivot axis brackets;
   (d) left and right upper front pivot axis brackets mounted at sides of the lid at the lower edge thereof;
   (e) left and right lower front pivot axis brackets mounted at sides of the tub at the upper edge thereof in positions forward of the left and right lower rear pivot axis brackets and rearward of the left and right upper front pivot axis brackets; and
   (f) an offset linkage pivotally connected between each of the left upper and lower front pivot axis brackets and each of the right upper and lower front pivot axis brackets.

2. The hinge mechanism of claim 1 wherein the base tub and the lid are made of ceramic.

3. The hinge mechanism of claim 2 wherein the left and right upper rear pivot axis brackets and the left and right upper front pivot axis brackets are mounted on the lid via a clamping band encircling a periphery of the lid at a bottom edge thereof and wherein the left and right lower rear pivot axis brackets and left and right lower front pivot axis brackets are mounted on the tub via a clamping band encircling a periphery of the tub at the top edge thereof.

4. The hinge mechanism of claim 1 comprising additionally a spring connected between a linkage and the tub at the upper edge thereof in a position rearward of the at least one offset linkage bar.

5. The hinge mechanism of claim 4 wherein the spring is selected from the group consisting of an extension type coil spring, a torsion spring, a compression spring, a leaf spring, a gas spring and a hydraulic spring.

6. A hinge mechanism for a grill having a base tub including an open top defined by a upper edge thereof and a lid having an open bottom defined by a bottom edge thereof and adapted to be mated to the open top of the base tub, the hinge mechanism comprising:
   (a) left and right upper rear pivot axis brackets mounted at a rear of the lid at the lower edge thereof and protruding rearward and outward from the lid;
   (b) left and right lower rear pivot axis brackets mounted at a rear of the tub at the upper edge thereof and protruding rearward and outward from the tub;
   (c) a rear linkage pivotally connected between each of the left upper and lower rear pivot axis brackets and right upper and lower rear pivot axis brackets;
   (d) left and right upper front pivot axis brackets mounted at sides of the lid at the lower edge thereof;
   (e) left and right lower front pivot axis brackets mounted at sides of the tub at the upper edge thereof in a position forward of the left and right lower rear pivot axis brackets and rearward of the left and right upper front pivot axis brackets;
   (f) an offset linkage pivotally connected between each of the left upper and lower front pivot axis brackets and each of the right upper and lower front pivot axis brackets; and (g) a spring connected to the linkage at a first end and the tub at a second end.

7. The hinge mechanism of claim 6 wherein the base tub and the lid are made of ceramic.

8. The hinge mechanism of claim 7 wherein the left and right upper rear pivot axis brackets and the left and right upper front pivot axis brackets are mounted on the lid via a clamping band encircling a periphery of the lid at a bottom edge thereof and wherein the left and right lower rear pivot axis brackets and left and right lower front pivot axis brackets are mounted on the tub via a clamping band encircling a periphery of the tub at the top edge thereof.

9. The hinge mechanism of claim 6 wherein the spring is selected from a group consisting of an extension type coil spring, a torsion spring, a compression spring, a leaf spring, a gas spring and a hydraulic spring.

10. The hinge mechanism of claim 6, wherein the linkage is a linkage bar.

11. The hinge mechanism of claim 10, wherein the spring is connected between at least one of the offset linkage bars and the tub at the upper edge thereof in a position rearward of the at least one offset linkage bar.

12. A hinge mechanism for a grill having a base tub including an open top defined by an upper edge thereof and a lid having an open bottom defined by a bottom edge thereof and adapted to be mated to the open top of the base tub, the hinge mechanism comprising:

(a) left and right upper rear pivot axis brackets mounted about a rear point of the lid at the lower edge thereof and protruding rearward and outward from the lower edge;

(b) left and right lower rear pivot axis brackets mounted about a rear point of the tub at the upper edge thereof and protruding rearward and outward from the upper edge;

(c) a rear linkage bar pivotally connected between each of the left upper and lower rear pivot axis brackets and right upper and lower rear pivot axis brackets;

(d) left and right upper front pivot axis brackets mounted at sides of the lid at the lower edge thereof;

(e) left and right lower front pivot axis brackets mounted at sides of the tub at the upper edge thereof in a position forward of the left and right lower rear pivot axis brackets and rearward of the left and right upper front pivot axis brackets; and (f) an offset linkage pivotally connected between each of the left upper and lower front pivot axis brackets and each of the right upper and lower front pivot axis brackets.

13. The hinge mechanism of claim 12, wherein the left and right upper rear pivot axis brackets are mounted within several inches of each other and equidistant from the rear point of the tub.

14. The hinge mechanism of claim 12 further comprising a spring for assisting the opening and closing of a grill lid.

15. The mechanism of claim 14 wherein the spring is connected between a linkage bar and the tub at the upper edge thereof in a position rearward of the at least one offset linkage bar.

16. The mechanism of claim 15 wherein the spring is selected from a group consisting of an extension type coil spring, a torsion spring, a compression spring, a leaf spring, a gas spring and a hydraulic spring.

* * * * *